(12) United States Patent
Fischer et al.

(10) Patent No.: US 8,647,998 B2
(45) Date of Patent: Feb. 11, 2014

(54) CATALYST REGENERATION APPARATUS AND ASSOCIATED REGENERATION PROCESS

(75) Inventors: Beatrice Fischer, Lyons (FR); Eric Sanchez, Saint Genis Laval (FR); Gilles Ferschneider, Chaponnay (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 373 days.

(21) Appl. No.: 13/058,974

(22) PCT Filed: Jul. 23, 2009

(86) PCT No.: PCT/FR2009/000914
§ 371 (c)(1),
(2), (4) Date: Apr. 19, 2011

(87) PCT Pub. No.: WO2010/018318
PCT Pub. Date: Feb. 18, 2010

(65) Prior Publication Data
US 2011/0190113 A1    Aug. 4, 2011

(30) Foreign Application Priority Data
Aug. 13, 2008 (FR) .................................... 08 04605

(51) Int. Cl.
*B01J 38/04* (2006.01)
*B01J 38/12* (2006.01)
*B01J 38/30* (2006.01)
*B01J 38/34* (2006.01)

(52) U.S. Cl.
USPC .................. 502/43; 502/34; 502/38; 502/41

(58) Field of Classification Search
USPC ..................................................... 502/20–56
See application file for complete search history.

(56) References Cited

U.S. PATENT DOCUMENTS 5,034,117 A * 7/1991 De Bonneville et al. ..... 208/140
6,239,055 B1    5/2001 Brunet et al.

FOREIGN PATENT DOCUMENTS

EP    0 873 784 A    10/1998
FR    2651154        3/1991

OTHER PUBLICATIONS

International Search Report of PCT/FR2009/000914, Date of Completion Nov. 4, 2009, Date of Nov. 13, 2009.

* cited by examiner

*Primary Examiner* — Jennifer Smith
(74) *Attorney, Agent, or Firm* — Millen, White, Zelano & Branigan, P.C.

(57) ABSTRACT

The present invention relates to a continuous catalyst regeneration device comprising at least one burning zone formed by at least one annular combustion zone (3), centered along a longitudinal axis (A), in which the catalyst circulates, an inlet conduit of the catalyst (4) and an outlet conduit of the catalyst (4'), an external zone (11) for circulation of a combustive gas disposed around the annular combustion zone (3) and an internal circulation zone (15) disposed inside the annular combustion zone (3), wherein the burning zone is divided into sectors (14) by hermetic longitudinal plates (10) disposed radially relative to the longitudinal axis (A) of the regenerator. The invention also relates to the process using this device.

13 Claims, 9 Drawing Sheets

CATALYST REGENERATION APPARATUS AND ASSOCIATED REGENERATION PROCESS

The present invention relates to the field of catalyst regeneration, and more specifically to a continuous catalyst regeneration device and to the regeneration process using this device. It is already known to continuously regenerate catalysts in catalytic processes where the catalyst undergoes rapid coking causing deactivation thereof. This is for example the case with very rigorous catalytic reforming, at a high reactor inlet temperature (500-520° C.), low pressure (3-6 bar) and a low hydrogen recycling rate (1.5-2.5). In this case, the catalyst is continuously extracted from the reactors, purged of the hydrogen which it contains and sent to a regenerator where the coke is burned in a controlled manner in order to re-establish the activity of the catalyst. It is therefore important to avoid excessive heating of the catalyst during this regeneration operation in order not to impair its catalytic performance levels; this requires the coke to be burned with oxygen which is highly diluted by inert gases (nitrogen and carbon dioxide for example). It is also known and conventional to recycle combustion gases having a low oxygen content in order to serve as a diluent, by injecting a small amount of air so that the oxygen content is sufficiently low. It also occurs that the combustion is carried out in two steps, a low-temperature step in order to burn the majority of the coke at a certain temperature and a second step in order to finish the burning at a higher temperature, with a slight increase in temperature due to the small amount of residual coke. Reference may be made, in particular, to patent FR 2 651 154 which describes a regeneration device with two successive burning zones allowing better combustion of the coke and therefore better regeneration of the catalyst.

In the prior art, the burning is often carried out in a thin radial bed which is disposed in a ring and in which the catalyst circulates downward by gravity at a low speed and where the burning gas circulates radially through the bed, often from the outside of the bed to the inside. A regeneration gas circuit is installed, comprising various items of equipment, including a recycling compressor and often a dryer.

One of the drawbacks of these items of equipment is that they necessitate the use of a large amount of burning gas, and consequently a large amount of energy. Use thereof is therefore very expensive, in particular when they are used for high capacities.

The present invention therefore seeks to overcome one or more of the drawbacks of the prior art by proposing a new type of regenerator, and the associated process, allowing the size of the equipment used to be reduced for the same amount of regenerated catalyst.

For this purpose, the present invention proposes a continuous catalyst regeneration device comprising at least one burning zone formed by at least one annular combustion zone, centred along a longitudinal axis, in which the catalyst circulates, an inlet conduit of the catalyst and an outlet conduit of the catalyst, an external zone for circulation of a combustive gas disposed around the annular combustion zone and an internal circulation zone disposed inside the annular combustion zone, wherein the burning zone is divided into sectors by hermetic longitudinal plates disposed radially relative to the longitudinal axis of the regenerator. According to one embodiment of the invention, the number of sectors is between 3 and 12. According to one embodiment of the invention, each sector is in communication with the following sector through a connection conduit in which the combustive gas circulates.

In the regeneration device according to the invention, each sector is supplied with oxygen through an oxygen conduit opening into the connection conduit.

The regeneration device according to the invention comprises a conduit for supplying the combustive gas opening into the annular external circulation zone of the first sector and a conduit for discharging the combustive gas leaving the annular internal circulation zone of the last sector.

According to a variant of the invention, the regeneration device comprises a conduit for supplying the combustive gas opening into the annular internal circulation zone of the first sector and a conduit for discharging the combustive gas leaving the annular external circulation zone of the last sector.

According to one embodiment of the invention, there are two burning zones, the first burning zone being at a temperature lower than that of the second burning zone.

According to one embodiment of the invention, the first burning zone comprises a third annular circulation zone disposed inside the annular internal circulation zone allowing the combustive gas to circulate between the annular internal circulation zone of the second burning zone of a first sector and the annular external circulation zone of the first burning zone of a second sector.

According to one embodiment of the invention, the regeneration device comprises a secondary oxygen conduit opening between the two burning zones and allowing an additional contribution of oxygen.

According to one embodiment of the invention, the burning zone comprises an upper screen and a lower screen preventing the combustive gas from circulating directly from the supply conduit to the discharge conduit without passing through the catalyst.

The invention also relates to a catalyst regeneration process wherein the catalyst descends by gravity into an annular combustion zone divided into sectors, and wherein the combustive gas passes through each sector successively, the combustive gas being cooled and refilled with oxygen between each sector.

In the process according to the invention, the combustive gas passes through the annular combustion zone from the outside to the inside.

According to one embodiment of the invention, the catalyst is a catalytic reforming catalyst.

According to one embodiment of the invention, the catalyst passes through two annular combustion zones which are disposed one above the other and split into sectors, the catalyst circulating first into the first annular combustion zone then into the second annular combustion zone through intermediate conduits, and wherein the combustive gas circulates first through the first annular combustion zone of the first sector then, after refilling with oxygen, through the second annular combustion zone of the first sector, then successively into all the other sectors, while being each time refilled with oxygen before each sector and between each annular combustion zone and cooled before each sector.

According to one embodiment of the invention, the temperature of the first annular combustion zone is between 400° C. and 550° C. and the temperature of the second annular combustion zone is at a temperature higher by at least 10° C. and by at most 40° C. relative to that of the first annular combustion zone.

BRIEF DESCRIPTION OF THE DRAWINGS

Other features and advantages of the invention will be better understood and will become clearer on reading the description provided, hereinafter, with reference to the appended figures which are given by way of example and in which.

Figure 1:
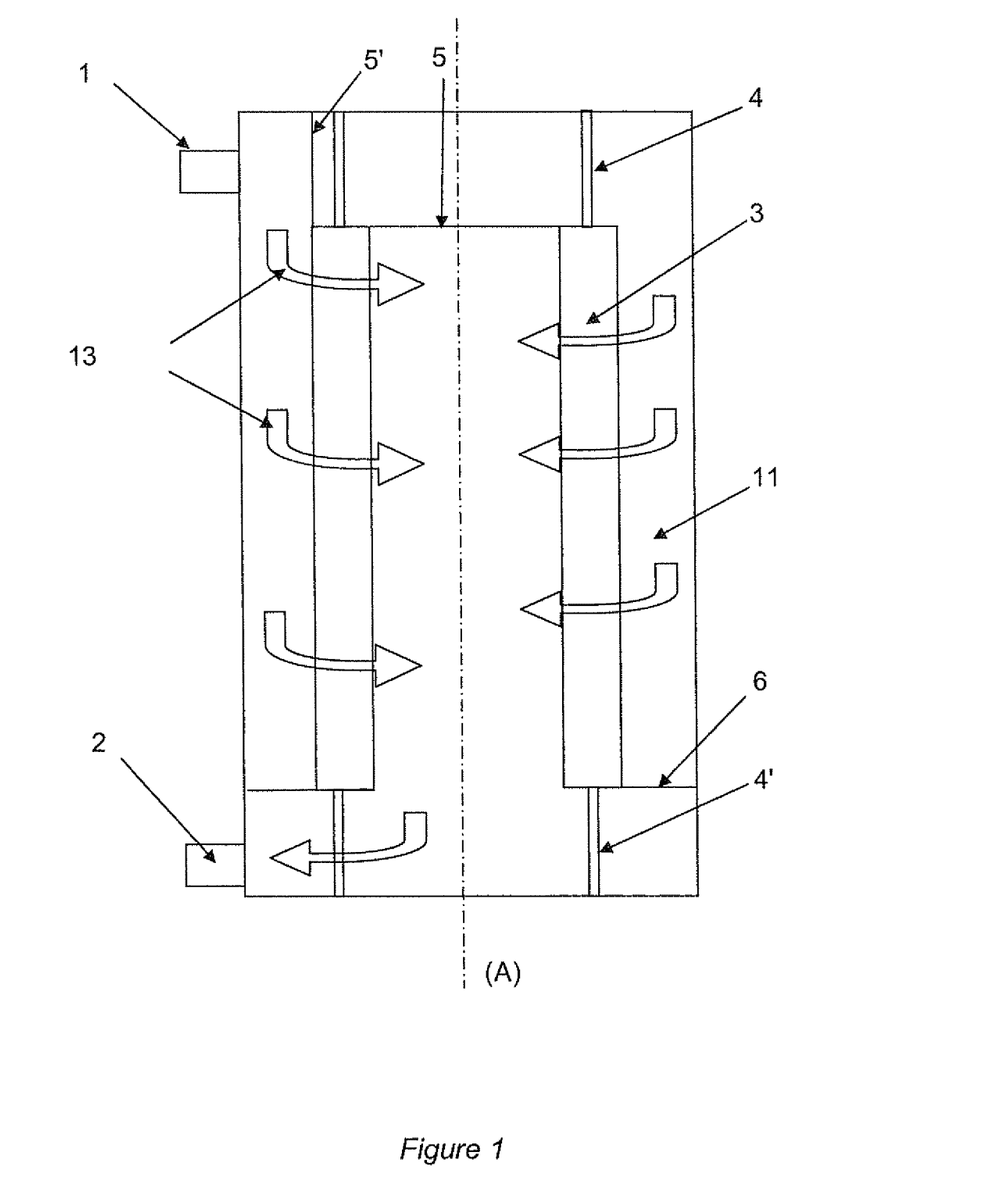
FIG. 1 is a schematic side view of the burning zone according to the prior art.
Figure 2:
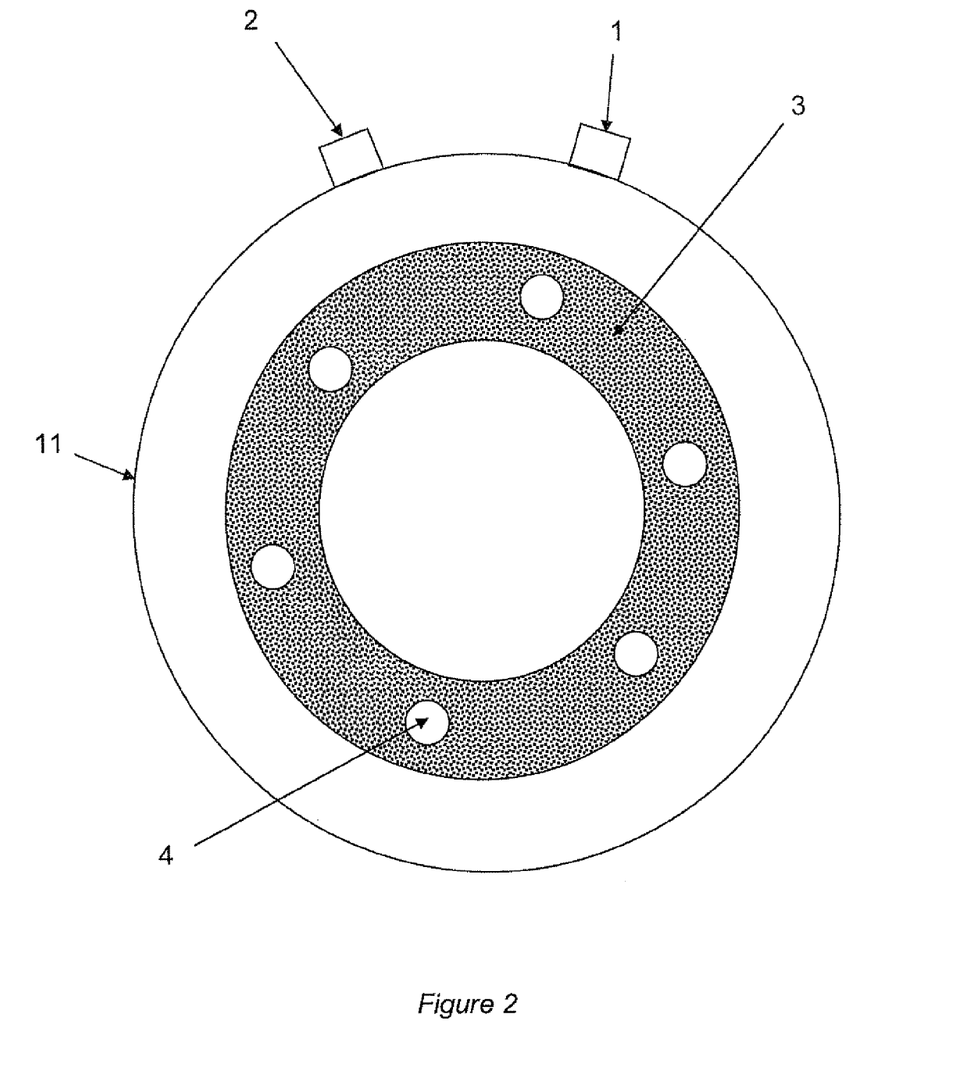
FIG. 2 is a schematic plan view of the burning zone according to the prior art.

FIGS. 1 and 2 illustrate a catalyst regeneration apparatus or regenerator according to the prior art. The apparatus presented here is cylindrical in shape along a longitudinal axis (A). It consists of an annular combustion zone (3) which is centred on the longitudinal axis of the regenerator and in which the coke is burned. This annular combustion zone (3) is supplied with catalyst through inlet conduits (4) through which catalyst descends. The regenerator also comprises an annular external zone (11) for circulation of the combustive gas surrounding the annular combustion zone (3) and an annular internal circulation zone (15) within the annular combustion zone (3). It is this set of annular combustion (3) and external (11) and international (15) circulation zones that forms the burning zone of the regenerator. The catalyst is conveyed through inlet conduits (4) then passes through the annular combustion zone (3) and is discharged through outlet conduits (4') through which catalyst descends. The combustive mixture forming the combustive gas (13), composed of a low proportion of oxygen diluted in a nitrogen/carbon dioxide mixture, enters the annular combustion zone (3) through a supply conduit (1). An upper screen (5, 5') forces the combustive gas (13) arriving through the supply conduit (1) to circulate into the annular outer circulation zone (11) then to pass through the catalyst which is located in the annular combustion zone (3) before descending through the centre (15) of the regenerator located within the annular combustion zone (3). The combustive gas therefore circulates radially through the catalyst. The combustive gas (13) then passes between the catalyst outlet conduits (4') and is discharged through the lower discharge conduit (2) of the burning zone. A lower screen (6) prevents direct communication between the inlet and the outlet of the burning zone, and thus prevents the gas (13) from passing directly from the supply conduit (1) to the discharge conduit (2) without having passed through the catalyst.

In relation to this prior art device, considering the annular catalyst combustion zone (3) in which the catalyst circulates and which is passed through by the combustive gas (13), the principle of the present invention (illustrated in FIGS. 3 to 9) is to split this annular combustion zone (3) into a plurality of sectors into which the combustive gas (13) will circulate successively, with injection of gas containing oxygen mixed with colder inert gas at the inlet of each sector, so as to have the same temperature and the same oxygen content at the inlet of each sector.

As illustrated in FIGS. 3 to 8, the device according to the invention consists of sectors (14). These sectors are formed by hermetic longitudinal plates (10) made of the same material as the annular zone and disposed radially, i.e. along the radii of the regenerator. Within the scope of the invention, the term "first sector" refers to the sector in which the regenerator is supplied with combustive gas (13). The other sectors are named the second sector, third sector, etc. up to the last sector while observing the order of circulation of the combustive gas (13) in the regenerator. The sectors illustrated in FIGS. 3 to 8 are identical in size, although in some cases it may be necessary for certain sectors to be of different sizes.

Figure 3:
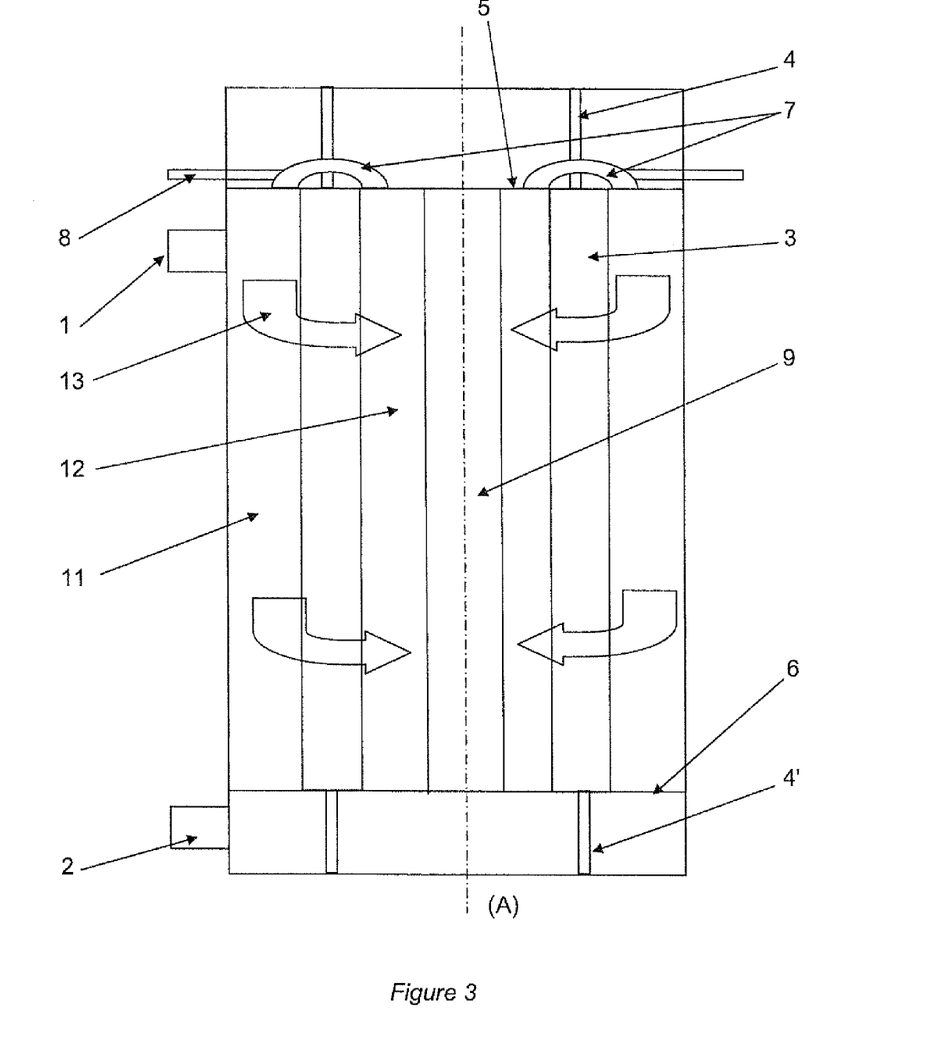
FIG. 3 is a schematic side view of the burning zone according to the invention.
Figure 4:
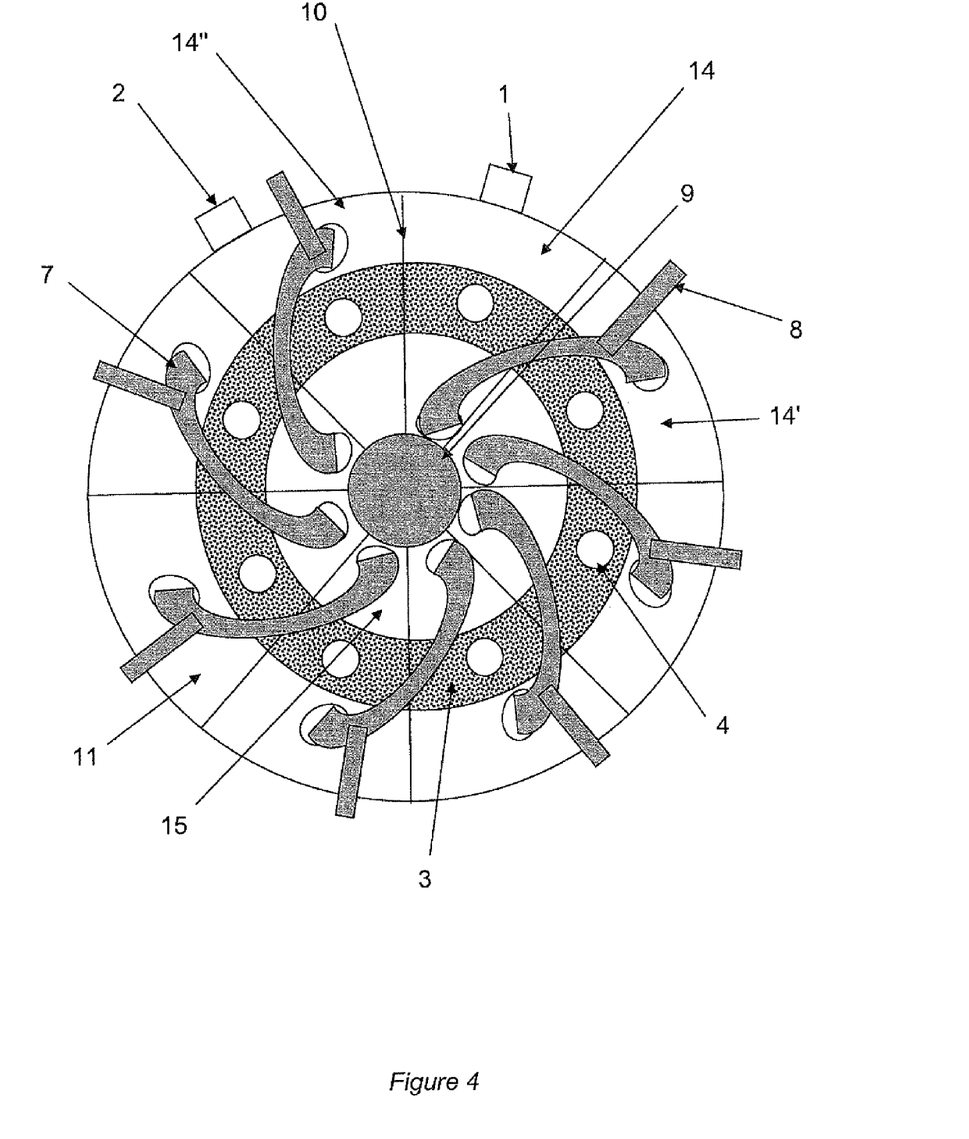
FIG. 4 is a schematic plan view of the burning zone according to the invention.
Figure 5:
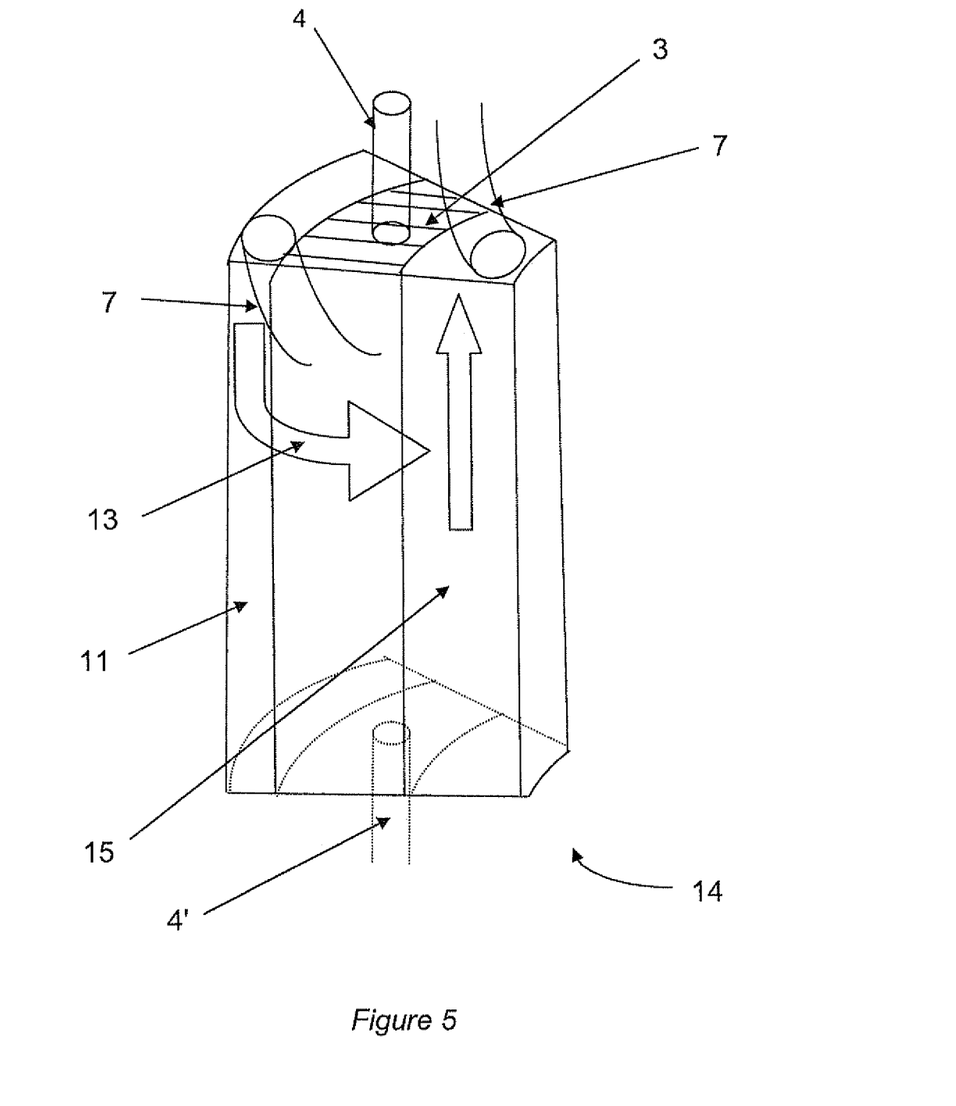
FIG. 5 is a perspective view of a sector of the apparatus according to the invention.

During operation of the regenerator, illustrated in FIGS. 3 to 5, the combustive gas (13) feeds, through the supply conduit (1), an annular external circulation zone (11) of the first sector (14) (which may be seen in FIG. 4), then passes through the catalyst which is located in the annular combustion zone (3). The combustive gas (13) then rises again to the top of the burning zone through an internal circulation zone (15), disposed inside the annular combustion zone (3), in order to be conveyed into the annular external circulation zone (11) of a second sector (14') (which may be seen in FIG. 4) through a connection conduit (7). The oxygen necessary for burning the coke in the second sector (14') is conveyed into the connection conduit (7) through an oxygen conduit (8). It is this connection conduit (7) which allows the combustive gas (13) to circulate from one sector (14) to the other (14'). The oxygen used is diluted beforehand by a cold gas, also allowing the gas to be cooled at the inlet of the second sector (14''). The gas then circulates into all the sectors (14) of the burning zone in the same way up to the last sector (14'') and is then discharged through the discharge conduit (2). In this device, the combustive gas (13) therefore circulates, for each sector, from the outside to the inside of the cylinder forming the regenerator.

The combustive gas (13) used is composed of a low proportion of oxygen diluted in a nitrogen/carbon dioxide mixture. The amount of oxygen is between 0.2 and 0.8% (about 0.5%).

The system operates at a pressure of between 2 and 10 bar, preferably between 4 and 7 effective bar.

The annual combustion zone is at a temperature of between 400 and 550° C., and preferably between 450° C. and 520° C.

A variant (not shown) of this device consists in causing the combustive gas (13) to circulate from the inside to the outside of the regenerator. For this purpose, the supply conduit (1) opens into the annular internal circulation zone (15) and the connection conduit (7) then connects the annular external circulation zone (11) of a first sector (14) with the annular internal circulation zone (15) of the following sector (14').

The burning zone therefore consists of at least two mutually separate sectors (14, 14') in which the combustive gas (13) circulates. Each sector thus allows a certain amount of catalyst to be treated.

The device according to the invention comprises an additional central zone (9) which is located at the centre of the regenerator and is a free zone intended to promote mounting of the apparatus.

The advantage of this sector arrangement is to greatly reduce the amount of combustive gas. That is to say, as the gas (13) circulates from one sector (14) to the other (14'), the device uses only the necessary amount of combustive gas (13) for a sector (14). This allows savings to be made on all the items of equipment providing the circulation, heating, cooling and drying of this gas.

Figure 7:
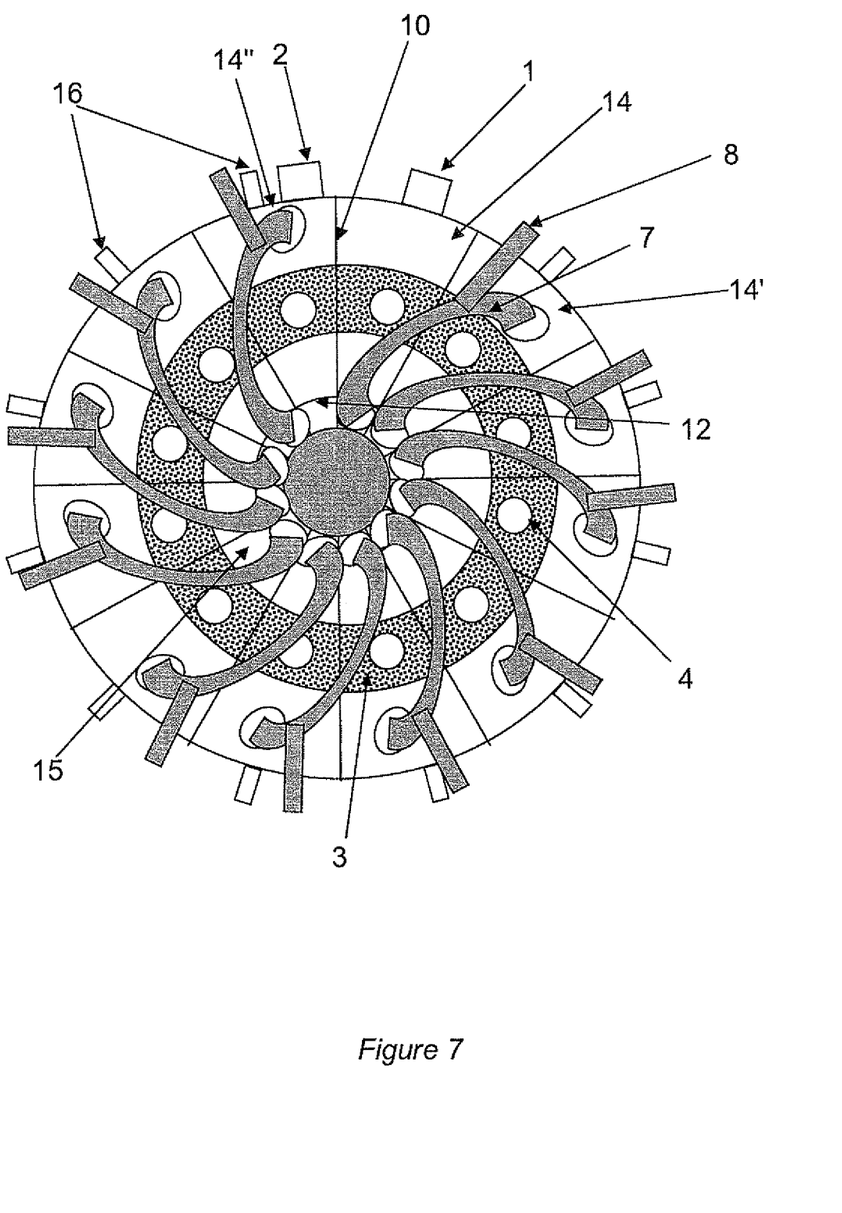
FIG. 7 is a schematic plan view of the burning zone according to a variant of the invention.

FIG. 4, which illustrates the burning zone of the present invention divided into sectors by plates (10), shows a burning zone with 8 sectors (14), although this number does not entail any limitation and the burning zone can comprise 3 to 12 sectors (14) as illustrated in FIG. 7, and preferably between 4 and 8 sectors.

Figure 6:
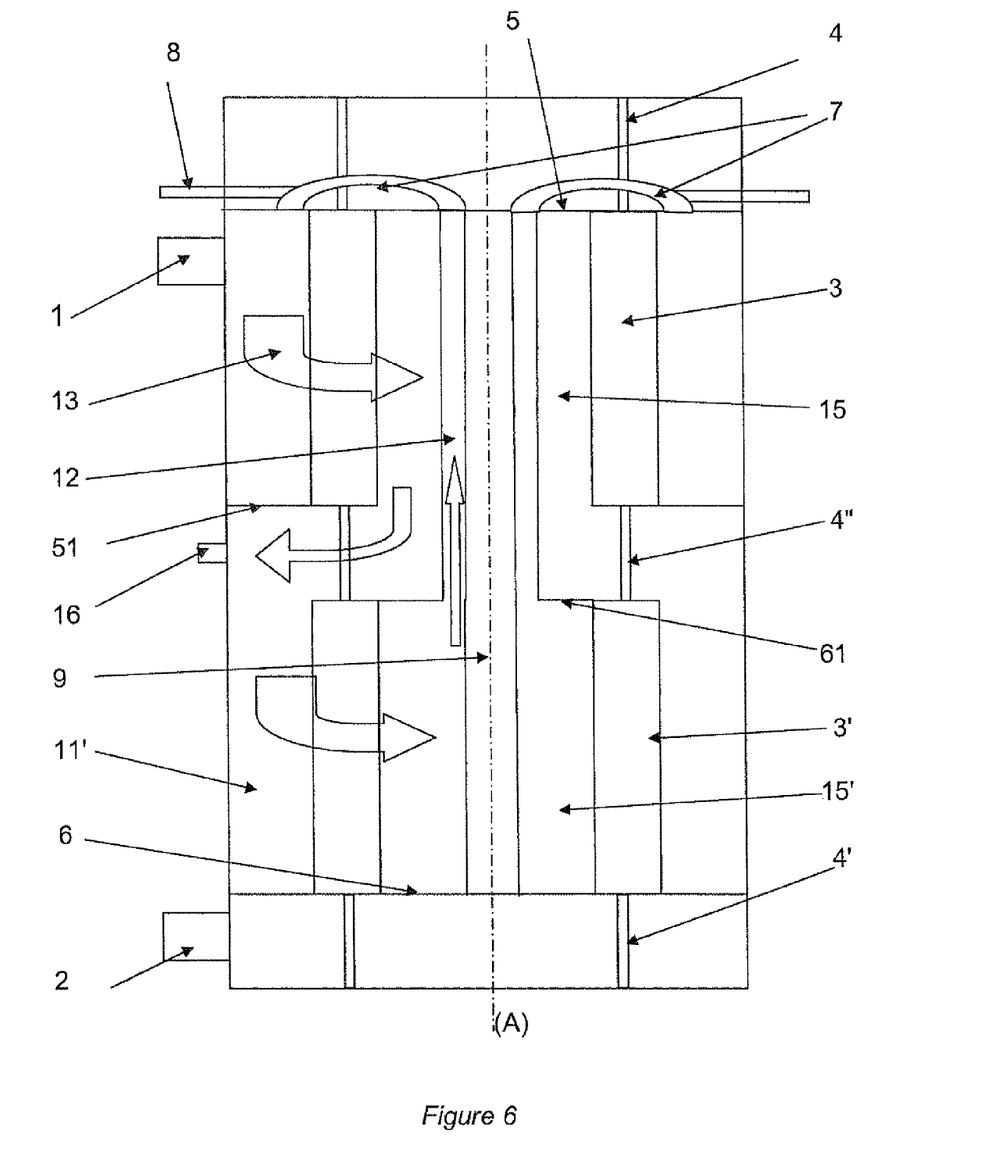
FIG. 6 is a schematic side view of the burning zone according to a variant of the invention.
Figure 8:
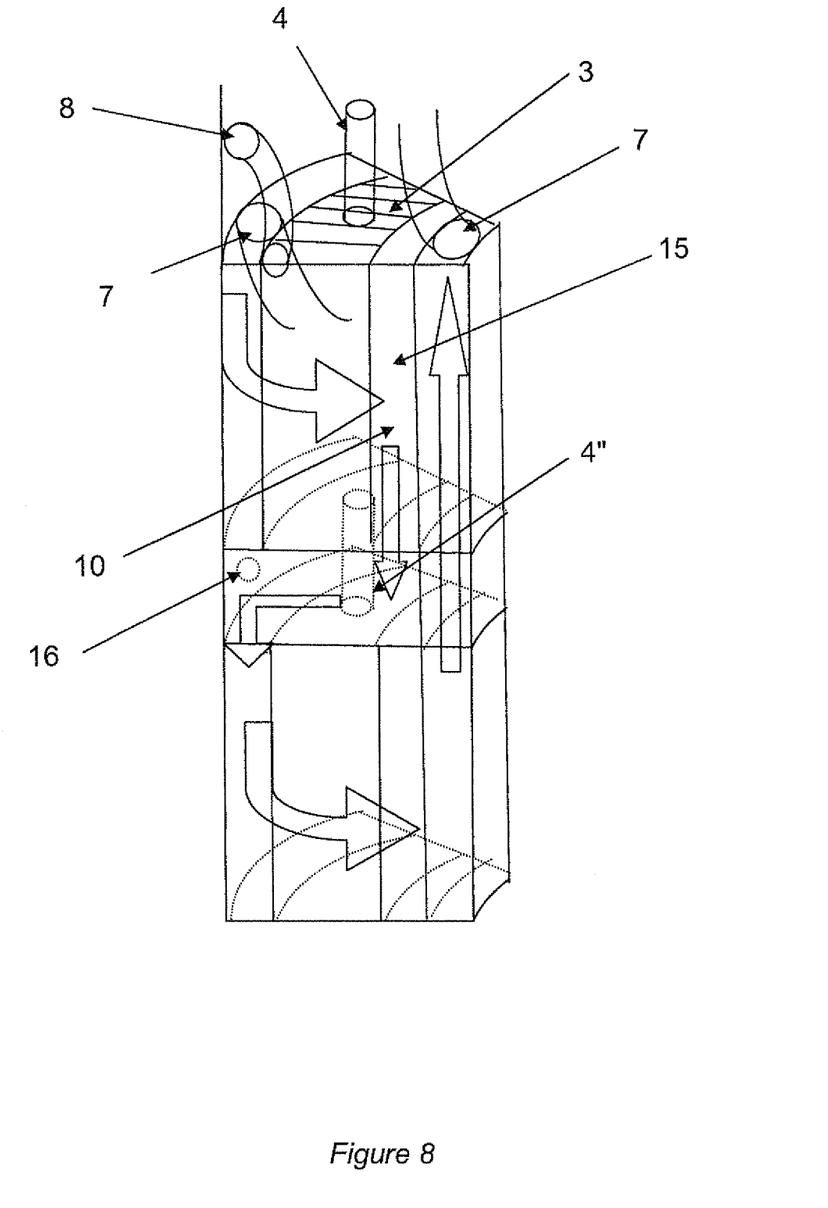
FIG. 8 is a perspective view of a sector of the apparatus according to a variant of the invention.

According to a preferred embodiment of the invention illustrated in FIGS. 6, 7 and 8, the device according to the invention can comprise two consecutive burning zones, disposed one above the other, at two different temperatures. The lower zone has an inlet temperature which is slightly higher, by 10° C. to 40° C., than the first zone. At the outlet of the first zone, where combustion has ceased due to a lack of oxygen, little coke is left. In the second zone, in order to achieve combustion, the temperature is higher and there is a larger amount of oxygen; there is therefore no risk of overheating as the residual amount of coke is low, and there is therefore little heating (delta T). It is thus possible to tell that combustion is complete if there is still oxygen in the output stream.

The two zones each consist of an annular external (11, 11') and internal (15, 15') zone for circulation of the combustive gas (13) and of an annular combustion zone (3, 3'). The annular combustion zones (3, 3') are connected by intermediate conduits (4"). The device is therefore formed of sectors each comprising a portion of the two burning zones. The connection between each sector is produced by way of the connection conduit (7) in which the combustive gas (13) circulates. Oxygen arrives through the oxygen conduit (8). The first burning zone comprises a third annular circulation zone (12) which is disposed within the second annular internal circulation zone (15) and which allows circulation of the combustive gas (13) originating from the second annular circulation zone (15') of the second burning zone. It is by way of this third annular circulation zone (12) that each sector (14) (apart from the last) is connected to the following sector (14'). Thus, the connection conduit (7) connects the second burning zone of one sector to the first burning zone of the following sector by the third annular circulation zone (12).

The upper portion of the first burning zone is closed by an upper screen (5) through which the conduits (4) and (7) pass. The lower portion of the first annular circulation zone and the annular combustion zone of the first burning zone are also closed by an intermediate lower screen (51).

The second burning zone has the same closure system, but the other way round. That is to say, it is the lower portion of the burning zone that is closed by a lower screen (6) and the upper portion of the second annular circulation zone and of the annular combustion zone that are closed by an intermediate upper screen (61).

During operation of the regenerator, the first annular combustion zone (3) is at a lower temperature than the second (3') and contains a small amount of oxygen, and the second annular combustion zone (3') is at a higher temperature and contains a larger amount of oxygen allowing the burning of the coke to be terminated. In this variant, the combustive gas (13) is introduced into the first sector (14) through the supply conduit (1), passes through the first annular combustion zone (3) in which the catalyst circulates, and is conveyed toward the bottom of the first burning zone. The combustive gas (13) is then mixed with diluted supplemental oxygen conveyed through the secondary oxygen conduit (16) which opens between the two burning zones, then is returned, still in the same sector, to the first annular external circulation zone (11) of the second burning zone, passes through the annular combustion zone (3') in order to achieve the combustion of the coke, arrives in the second annular internal circulation zone (15') and is sent through the third annular internal circulation zone (12) to the top of the burning zone where it is sent to the following sector through a conduit (7). At the outlet of the last sector (14"), the gas is sent to the bottom of the second burning zone toward the outlet conduit (2).

Figure 9:
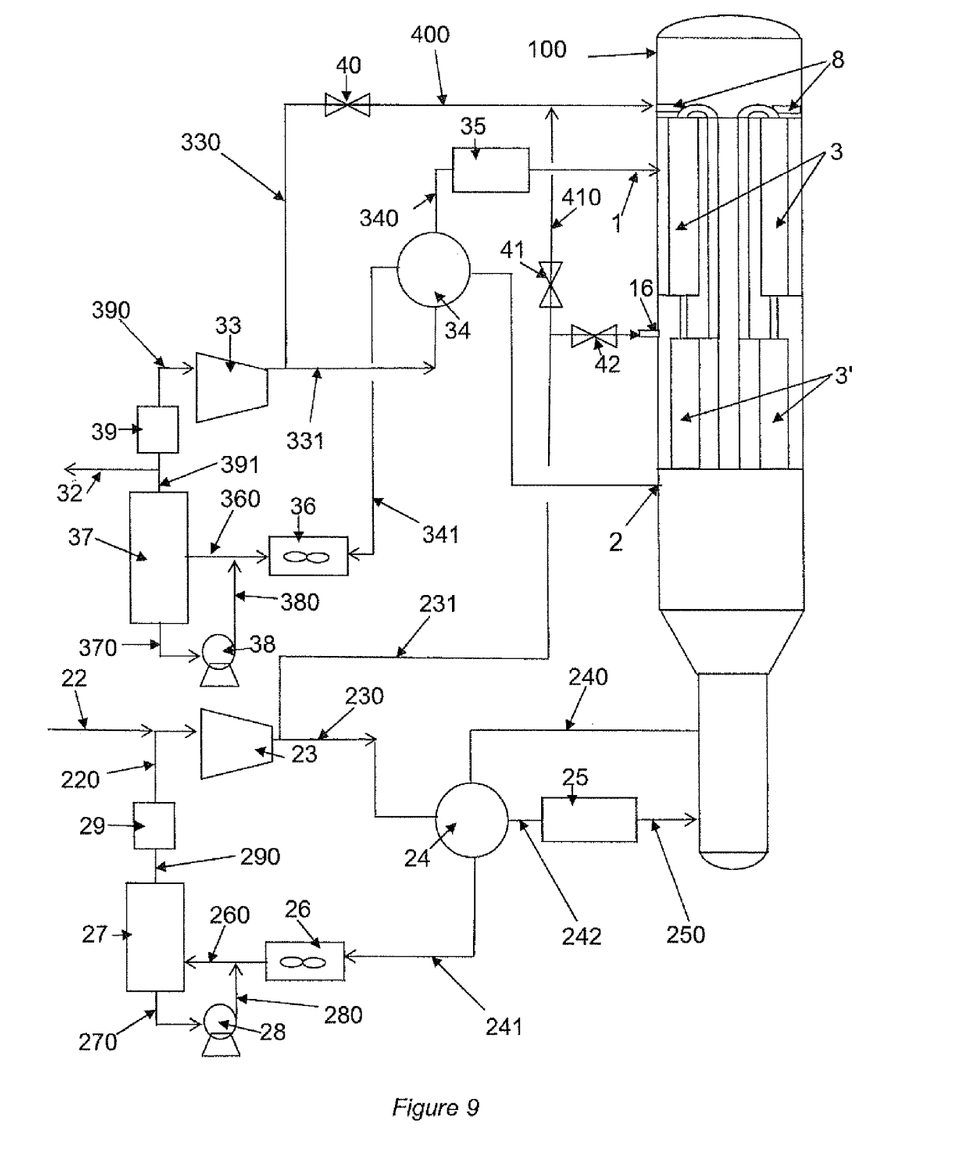
FIG. 9 is a schematic view of the regeneration circuits.

The regenerator (100) according to the invention can be used in the regeneration circuits illustrated in FIG. 9. A first circuit, circulation of which is provided by the compressor (33), is the circuit of the combustive gas. The circulated gas is basically nitrogen and carbon dioxide, with a very small residual amount of oxygen. The water produced by the combustion is removed by the dryer (39). The gas leaving the compressor (33) is divided into two streams (330, 331). The first stream (331) is heated by the heat exchanger (34) by way of exchange with the output gas (2), then passes into the oven (35) through the conduit (340) before being supplied to the burning zone through the conduit (1). The second stream (330) issuing from the exchanger (33) is sent at the outlet temperature of the compressor through the control valve (40) to a distributor (400) which will send an identical cold gas flow rate in the conduit (8) of each sector. A gas which has a high oxygen content and originates from another circuit (410) is also injected into this stream.

At the outlet of the burning zone, the combustive gas leaves through the conduit (2), is successively cooled in the heat exchanger (34) by exchange with the input gas, then passes into the cooling tower (36) through a conduit (341) and is mixed with the liquid originating from a conduit (380) of the pump (38) before entering the separator flask (37) through the conduit (360). This flask also serves to neutralise the burning gas which contains chlorine, owing to an injection of sodium hydroxide (not shown). The condensation water mixed with sodium hydroxide is drawn off through the conduit (370) and used for washing and neutralising the condensation zones in order to prevent corrosion. The remainder of the water is purged (line not shown).

The purified and wet gas is sent subsequently to the dryer (39) through the conduit (391) then to the recycle compressor (33) through a conduit (390). An amount of gas that is purged through the conduit (32) allows excess gas to be eliminated and the pressure of the loop of this first circuit to be kept constant.

The second circuit is used, in particular, for high-temperature drying of the catalyst in another zone of the regenerator. The drying gas, which is composed of nitrogen and from 5 to 10% of air, is dried by the dryer (29) and conveyed to the compressor (23) through the conduit (220) in order to be compressed. A portion (231) of the combustive gas is sent to the burning of the catalyst through the valves (41) and (42). The valve (41) allows the oxygen necessary for the combustion in the upper bed of the various sectors to be sent; the valve (42) adjusts the amount of oxygen for the combustion in the lower beds of the various sectors (supplying of the conduits 16). There is a flow-flow controller (FFC). The content of output oxygen is thus controlled (if there is any oxygen left, this means that all the coke has burned) by injecting the sufficient amount of diluted air, distributed in fixed proportion between the upper ring and the lower ring owing to the two regulating valves (41) and (42). The diluted air is then distributed equally between the various sectors through a system of orifices placed at the inlet of each sector.

The remainder of the gas (230) is successively heated in the heat exchanger (24), then (by passing through the conduit 242) in the oven (25) in order to reach the drying temperature, then passes into the drying bed (through the conduit 250). At the outlet (240) of the drying bed, the gas is cooled in the heat exchanger (24) and the cooling tower (26) which are joined together by the conduit (241). The gas is then mixed (270) with the washing liquid (280) pumped by the pump (28). The pump (28) is fed through the conduit (270) originating from the washing flask (27) into which the cooled gas/washing liquid mixture is conveyed through the conduit (260). The mixture is conveyed to the dryer (29) through the conduit (290). A make-up is conveyed through the conduit (22), drawn by the compressor, in order to compensate. This make-up consists on the one hand of instrument air, which is generally available at about 5 to 7 bar, is dry and deoiled, and on the other hand of nitrogen, so as to keep the composition of the circulated gas constant.

EXAMPLE 1

According to the Prior Art

This example uses a prior art regenerator with 2 combustion zones: a lower zone and an upper zone.

This example relates to a very rigorous and high-capacity catalytic reforming unit in which it is necessary to regenerate each day 40 tonnes of used catalyst filled with 6% coke. It is therefore necessary to burn 2,400 kg of coke per day, i.e. 100 kg of coke per hour, and the amount of oxygen necessary is therefore 370 kg/h.

The combustive gas comprises 85% nitrogen, 14.5% carbon dioxide and 0.5% diluted oxygen in order to prevent the temperatures from becoming too high.

The following Table A illustrates the flow rate, temperature and % of $O_2$ values involved in the regeneration device.

TABLE A

Flow rates for a device according to the prior art

| | Flow rates | Temperature (° C.) | | % of $O_2$ | |
|---|---|---|---|---|---|
| | tonnes/h | inlet | outlet | inlet | outlet |
| Annular upper combustion zone | 45.5 | 450 | 502 | 0.5 | 0 |
| Annular lower combustion zone | 47.2 | 489 | 514 | 0.8 | 0.5 |

After purging at the separator in order to maintain the pressure, and drying, the flow rate at the compressor is 45.5 tonnes/h instead of 58 tonnes/h for a regenerator with a mere combustion zone. The consumption of the compressor is about 730 kW (suction 4.8 bar; backflow 8 bar; polytropic efficiency 82%), and the air compressor will consume about 100 kW, i.e. 830 kW in total.

EXAMPLE 2

According to the Invention

This example uses the regenerator illustrated in FIGS. 4 and 6, i.e. a regenerator having 8 sectors and 2 burning zones.

This example relates to a very rigorous and high-capacity catalytic reforming unit (reactor pressure about 5 bar absolute, inlet temperature 510° C., hydrogen recycling rate 1.8) in which it is necessary to regenerate each day 40 tonnes of catalyst filled with 6% coke. It is therefore necessary to burn 100 kg of coke per hour and the amount of oxygen necessary to burn this coke is 370 kg/h.

The combustive gas comprises 91.5% nitrogen, 8% carbon dioxide and 0.5% diluted oxygen in order to prevent the temperatures from becoming too high. The difference in the composition of the combustive gas for the two cases, with regard to the amount of nitrogen and carbon dioxide, stems from the fact that the air is not made up under the same conditions since, in the second case, the make-up is carried out using air diluted by nitrogen originating from the oxychlorination circuit. However, the oxygen content remains the same in both cases, and this is the interesting factor from the point of view of combustion.

In order to simplify the controlling of the flow rates, the same amounts of supplemental oxygen are injected into each of the 8 sectors through a system of restricted orifices. Despite this simplification, the temperatures and the compositions are very similar in each sector.

The following Table B illustrates the flow rates, temperature and % of $O_2$ involved in the lower portion and the upper portion of each sector.

TABLE B

Flow rates for a device according to the invention

| Sectors | Flow rates (T/h) | | | sector inlet | Temperature (° C.) | | % of $O_2$ | |
|---|---|---|---|---|---|---|---|---|
| | prior to make-up | supplemental inert gas | supplemental gas having a high $O_2$ content | | inlet | outlet | inlet | outlet |
| 1 upper | — | — | — | 7.03 | 450 | 492 | 0.05 | 0.01 |
| 1 lower | 7.03 | — | 0.29 | 7.34 | 476 | 497 | 0.06 | 0.04 |
| 2 upper | 7.3 | 0.92 | 0.07 | 8.33 | 450 | 486 | 0.05 | 0.02 |
| 2 lower | 8.3 | | 0.29 | 8.63 | 473 | 490 | 0.06 | 0.04 |
| 3 upper | 8.6 | 0.92 | 0.07 | 9.62 | 451 | 481 | 0.05 | 0.03 |
| 3 lower | 9.6 | | 0.29 | 9.93 | 470 | 485 | 0.06 | 0.04 |
| 4 upper | 9.9 | 0.92 | 0.07 | 10.92 | 451 | 478 | 0.05 | 0.03 |
| 4 lower | 10.9 | | 0.29 | 11.23 | 468 | 481 | 0.06 | 0.05 |
| 5 upper | 11.2 | 0.92 | 0.07 | 12.22 | 451 | 475 | 0.05 | 0.03 |
| 5 lower | 12.2 | | 0.29 | 12.53 | 466 | 478 | 0.06 | 0.05 |
| 6 upper | 12.5 | 0.92 | 0.07 | 13.52 | 451 | 473 | 0.05 | 0.03 |
| 6 lower | 13.5 | | 0.29 | 13.82 | 465 | 476 | 0.06 | 0.05 |
| 7 upper | 13.8 | 0.92 | 0.07 | 14.81 | 451 | 471 | 0.05 | 0.04 |
| 7 lower | 14.8 | | 0.29 | 15.12 | 464 | 474 | 0.06 | 0.05 |
| 8 upper | 15.1 | 0.92 | 0.07 | 16.11 | 451 | 470 | 0.05 | 0.04 |
| 8 lower | 16.1 | | 0.29 | 16.42 | 463 | 472 | 0.06 | 0.05 |

After purging at the separator (37) in order to maintain the pressure, and drying (39), the flow rate of combustive gas at the compressor (33) is 13.5 tonnes/h (7.03+7×0.92); the suction pressure is 4.8 bar, the backflow 8 bar, the polytropic efficiency 82% and the energy balance is 225 kW.

The flow rate of gas at the drying gas compressor (23) is 4.35 tonnes/h, the suction pressure 4.8 bar, the backflow 8 bar, the polytropic efficiency 82% and the consumption 74 kW.

In total, both compressors consume 315 kW; this is much less than the 830 kW of Example 1. A comparison of these results with those of the prior art reveals that the amount of combustive gas used with the device according to the invention corresponds to 30% of the amount of combustive gas used with a device according to the prior art. The energy balance also corresponds to 30% of the consumption of a prior art device.

The sector regeneration device according to the invention allows a major gain in terms of both the amount of combustive gas and the amount of energy consumed.

It will be obvious to the person skilled in the art that the present invention does not have to be limited to the details provided hereinbefore and allows embodiments in a large number of other specific forms without departing from the field of application of the invention.

Consequently, the present embodiments must be considered by way of example, and may be modified without, however, departing from the scope defined by the appended claims.

The invention claimed is:

1. Continuous catalyst regeneration device comprising at least one burning zone formed by at least one annular combustion zone (3), centered along a longitudinal axis (A), in which the catalyst circulates, an inlet conduit of the catalyst (4) and an outlet conduit of the catalyst (4'), an external zone (11) for circulation of a combustive gas (13) disposed outside and around the annular combustion zone (3) and an internal circulation zone (15) disposed inside the annular combustion zone (3), wherein the burning zone is divided into sectors (14) by hermetic longitudinal plates (10) disposed radially relative to the longitudinal axis (A) of the regenerator, and wherein the external zone (11) of each sector (14) is in communication with the internal circulation zone (15) of a following sector (14') until the last sector (14"), through a connection conduit (7) in which the combustive gas (13) circulates, and is supplied with oxygen through an oxygen conduit (8) opening into the connection conduit (7).

2. Regeneration device according to claim 1, wherein the number of sectors (14) is between 3 and 12.

3. Regeneration device according to claim 1, comprising a conduit (1) for supplying the combustive gas opening into the annular external circulation zone (11) of the first sector (14) and a conduit (2) for discharging the combustive gas leaving the annular internal circulation zone (15) of the last sector (14").

4. Regeneration device according to claim 1, comprising a conduit (1) for supplying the combustive gas (13) opening into the annular internal circulation zone (15) of the first sector (14) and a conduit (2) for discharging the combustive gas (13) leaving the annular external circulation zone (11) of the last sector (14").

5. Regeneration device according to claim 1, wherein there are two burning zones, the first burning zone being at a temperature lower than that of the second burning zone.

6. Regeneration device according to claim 5, wherein the first burning zone comprises a third annular circulation zone (12) disposed inside the annular internal circulation zone (15) allowing the combustive gas (13) to circulate between the annular internal circulation zone (15') of the second burning zone of a first sector and the annular external circulation zone (11) of the first burning zone of a second sector (14').

7. Regeneration device according to claim 5, comprising a secondary oxygen conduit (16) opening between the two burning zones and allowing an additional contribution of oxygen.

8. Regeneration device according to claim 1, wherein the burning zone comprises an upper screen (5, 61) and a lower screen (6, 51) preventing the combustive gas from circulating directly from a supply conduit (1) to a discharge conduit (2) without passing through the catalyst.

9. Catalyst regeneration process using the device according to claim 1, wherein the catalyst descends by gravity into an annular combustion zone (3) divided into sectors (14), and wherein the combustive gas (13) passes through each sector (14) successively, the combustive gas (13) being cooled and refilled with oxygen between each sector.

10. Catalyst regeneration process according to claim 9, wherein the combustive gas (13) passes through the annular combustion zone (3) from the outside to the inside.

11. Catalyst regeneration process according to claim 9, wherein the catalyst is a catalytic reforming catalyst.

12. Catalyst regeneration process according to claim 9, wherein the catalyst passes through two annular combustion zones (3, 3') which are disposed one above the other and split into sectors (14), the catalyst circulating first into the first annular combustion zone (3) then into the second annular combustion zone (3') through intermediate conduits (4"), and wherein the combustive gas (13) circulates first through the first annular combustion zone (3) of the first sector then, after refilling with oxygen, through the second annular combustion zone (3') of the first sector, then successively into all the other sectors, while being each time refilled with oxygen before each sector and between each annular combustion zone and cooled before each sector.

13. Catalyst regeneration process according to claim 9, wherein the temperature of the first annular combustion zone (3) is between 400° C. and 550° C. and the temperature of the second annular combustion zone (3') is at a temperature higher by at least 10° C. and by at most 40° C. relative to that of the first annular combustion zone.

* * * * *

UNITED STATES PATENT AND TRADEMARK OFFICE
CERTIFICATE OF CORRECTION

PATENT NO. : 8,647,998 B2  Page 1 of 1
APPLICATION NO. : 13/058974
DATED : February 11, 2014
INVENTOR(S) : Fischer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 439 days.

Signed and Sealed this

Twenty-ninth Day of September, 2015

Michelle K. Lee
*Director of the United States Patent and Trademark Office*